Figure 1:
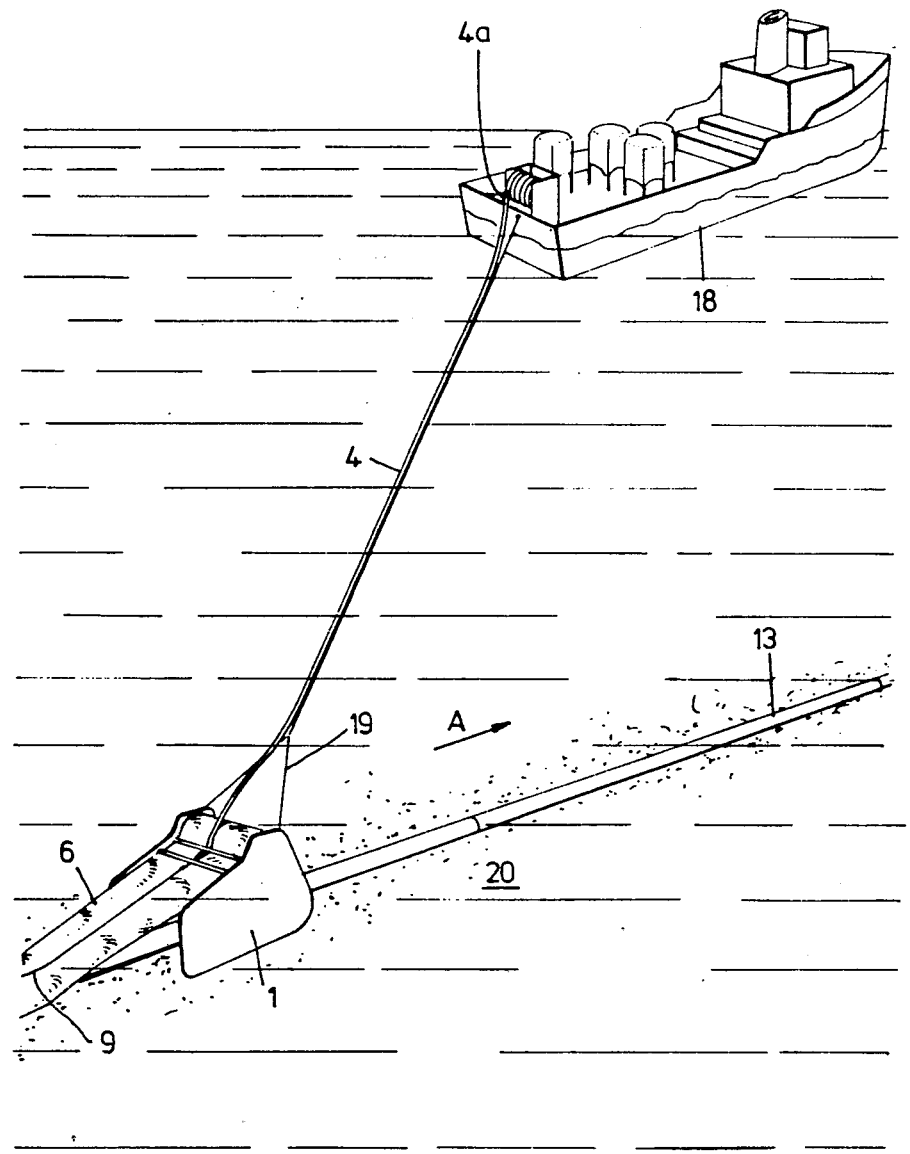

United States Patent [19]

Leuenberger

[11] Patent Number: 4,480,943
[45] Date of Patent: Nov. 6, 1984

[54] METHOD AND APPARATUS FOR LAYING UNDERWATER COVERINGS

[75] Inventor: Hermann Leuenberger, Steffisburg, Switzerland

[73] Assignee: Losinger AG, Bern, Switzerland

[21] Appl. No.: 397,197

[22] Filed: Jul. 12, 1982

[30] Foreign Application Priority Data

Apr. 8, 1982 [EP] European Pat. Off. ........ 82810156.8

[51] Int. Cl.³ .......................... E02D 15/06; F16L 1/00
[52] U.S. Cl. ..................................... 405/172; 405/17; 405/158
[58] Field of Search ................. 405/172, 155, 158, 17, 405/18

[56] References Cited

U.S. PATENT DOCUMENTS

| | | | |
|---|---|---|---|
| 3,425,277 | 2/1969 | Hillen | 405/18 |
| 3,779,027 | 12/1973 | Murphy | 405/172 |
| 3,793,845 | 2/1974 | Keith | 405/172 |
| 3,871,182 | 3/1975 | Estruco | |
| 4,352,590 | 10/1982 | Parker et al. | 405/172 X |

FOREIGN PATENT DOCUMENTS

| | | | |
|---|---|---|---|
| 570879 | 11/1961 | Belgium | 405/17 |
| 2349814 | 4/1975 | Fed. Rep. of Germany | 405/155 |
| 2814381 | 4/1978 | Fed. Rep. of Germany | |
| 2922410 | 4/1980 | Fed. Rep. of Germany | |
| 7512343 | 5/1976 | Netherlands | |
| 7808593 | 2/1979 | Netherlands | |
| 1264823 | 2/1972 | United Kingdom | |
| 2016565 | 9/1979 | United Kingdom | |
| 1585170 | 2/1981 | United Kingdom | |

OTHER PUBLICATIONS

The Concrete Blanket-A System for Permanent Protection of Subsea Pipelines by Professor R. Lenschow, Otter Group, Trondheim, Norway and References Norweigen Patent Application 771178 of 4/4/77.

Primary Examiner—Dennis L. Taylor
Attorney, Agent, or Firm—Oldham, Oldham, Hudak, Weber & Sand, Co.

[57] ABSTRACT

Apparatus comprising a vehicle such as a sledge containing a reel, bin, or the like, holding casing material folded flat, is disposed for travel immediately over an underwater object or piece ground to be covered and is towed by a surface vessel. Situated behind the supply of casing material, relative to the direction of travel, is a table comprising two hinged parts sloping down toward the bottom of the body of water, the lower of the two table parts being arranged to slide over the object or piece of ground to be covered. Concrete of plastic consistency coming from the surface vessel by means of a pressure hose is injected into the casing sliding over the table, the nozzle of the hose being inserted through an opening between the two edges of the casing material. This opening, which may be formed in a zipper by means of two zipper slides, is then closed by joining the two long edges to form the casing. The movement of the vehicle and the force of gravity cause the filled casing to slide down the table continuously onto the object or piece of ground to be covered. Two lateral arms may be provided for shaping the casing around and under a submerged object such as a pipeline. With this method and apparatus the number of divers needed for laying the covering is substantially reduced.

12 Claims, 19 Drawing Figures

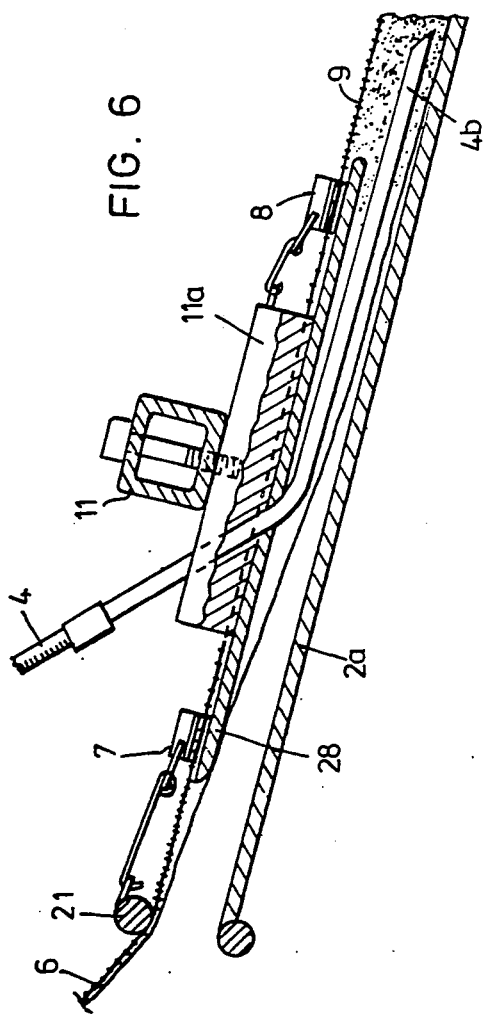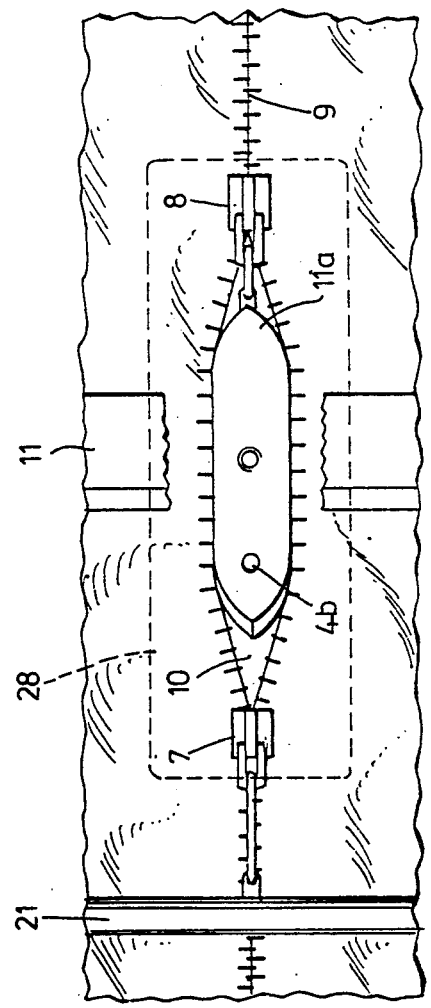

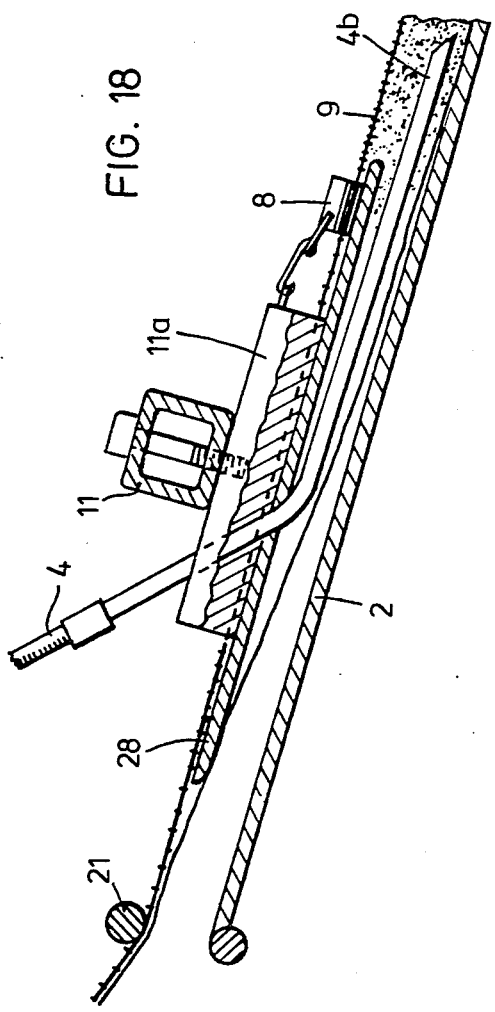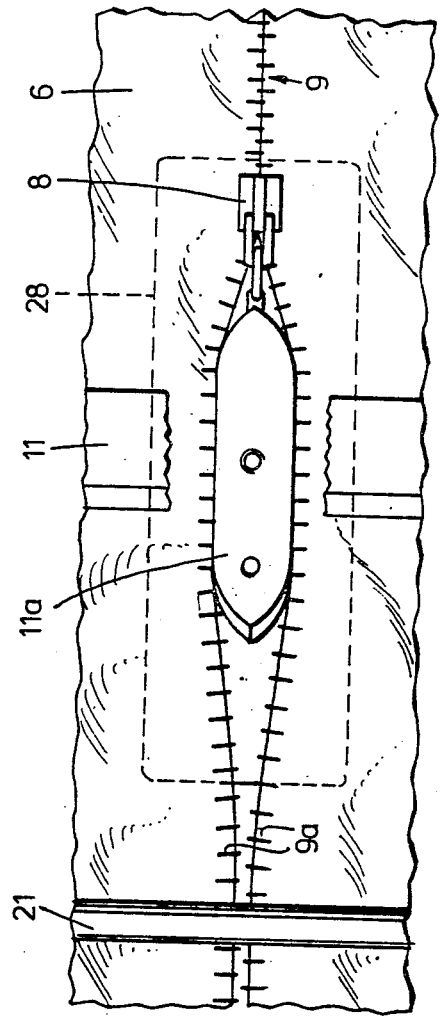

METHOD AND APPARATUS FOR LAYING UNDERWATER COVERINGS

This invention relates to the laying of coverings on submerged structures or on subaqueous piece of ground, and more particularly to a method and apparatus of the type wherein the covering is formed by controllably filling a casing lying directly over the structure or piece of ground with a substance under pressure. The apparatus for carrying out the method is of the type having a vehicle movable over the structure or the ground by, and controllable by, a surface vessel.

U.K. Pat. No. 1,585,170 describes a method of forming concrete structures for underwater pipelines. A flexible casing in the form of a bag about 4.5 meters long and about 3.5 meters wide is placed beneath or on the pipeline laid on the sea bed. By means of a flexible delivery pipe connected at one end to a concrete mixing apparatus on a surface vessel and at the other to a manifold communicating with the bag, liquid concrete under pressure is controllably introduced into the bag. The concrete-filled bag takes on a turgid shape which conforms to the curved surface of the pipeline, after which the concrete sets.

With this method, pipelines cannot be uninterruptedly covered by means of separate bags and are thus insufficiently protected. The individual bags can be rolled off by water currents, by anchors being weighed, etc., so that the pipeline is exposed.

This drawback was intended to be eliminated by the method according to German Disclosed Application (DOS) No. 28 14 381 for providing a protective arrangement for structures lying on the sea bed, particularly pipelines. Here the surface vessel is equipped with apparatus for forming a concrete blanket which is lowered to the sea bed and laid over the previously-laid pipeline. The concrete blanket comprises reinforcement netting and is encased in cloth or film. The blanket running off the surface vessel slopes down through the water to the pipeline, to which it adapts itself. In this way, a uniformly curved, uninterrupted shell of concrete is created over the pipeline.

In this method, the concrete blanket is laid over the pipeline continuously by the surface vessel while the concrete is still plastic. However, the concrete blanket cannot be laid precisely over the pipeline, especially not at fairly great depths; if not precisely laid, it can also slide off the pipeline. In order to prevent this, the laying operation must be continuously monitored by divers, which involves considerable expense.

A method of embedding a cable situated at the bottom of a body of water is described in German Disclosed Application (DOS) No. 29 22 410. Used for this purpose is an embedding vehicle which can be moved, particularly driven, over the bottom and contains a guide arrangement for the cable to be embedded. The embedding vehicle is pulled by an accompanying ship via a tow-rope.

This embedding vehicle, however, does not put a stable covering on the cable laid on the underwater surface.

It is an object of this invention to provide a method and apparatus for laying a covering over a structure or a piece of ground situated under water in an accurate an expeditious manner, permanently uninfluenced by currents of water.

A further object of this invention is to provide such a method and apparatus which virtually eliminates the need for supervision by divers, considerably facilitates the work carried out on board the surface vessel, and reduces the number of personnel on board.

Still another object of this invention is to provide such a method and apparatus whereby the covering laid, conforming to the shape of the structure, affords lasting protection against mechanical damage to the structure or to the piece of ground, as the case may be.

To this end, in the method according to the present invention, of the type initially mentioned, the web of material of which the casing is made is disposed in or on a supply contrivance connected to a table movable over the structure or piece of ground, is withdrawn form this supply contrivance, is formed into a shape having a closed cross-section by joining its long edges, and is filled with the mentioned material, after which the filled casing, under the force of gravity and through movement of the table, slides toward the structure or piece of ground and is continuously laid thereon.

In the apparatus according to the present invention, of the type initially mentioned, the supply contrivance is detachably secured to the vehicle, a pressure hose for the filler substance is also secured to the vehicle, the outlet end of the hose opening out into the interior of the casing and its intake end communicating with the surface vessel, and the table comprises a laying portion extending downward from the supply contrivance toward the structure or piece of ground and a launching portion having one end hinged to the laying portion and the other end resting on the structure or piece of ground, over which table portions the casing filled with the filler substance slides.

The apparatus may comprise a front slide, relative to the direction of travel of the vehicle, for opening a zipper running along the entire length of the casing, and a rear slide for closing the zipper. The two slides are secured to the vehicle at a distance from one another corresponding to the length of the opening in the casing.

The casing with the filler substance is preferably shaped at the end of the table nearest the structure or piece of ground. For this purpose, two arms secured to the sides of the launching portion of the table are preferably used, these arms being hydraulically or pneumatically swivellable in all directions.

Figure 2:
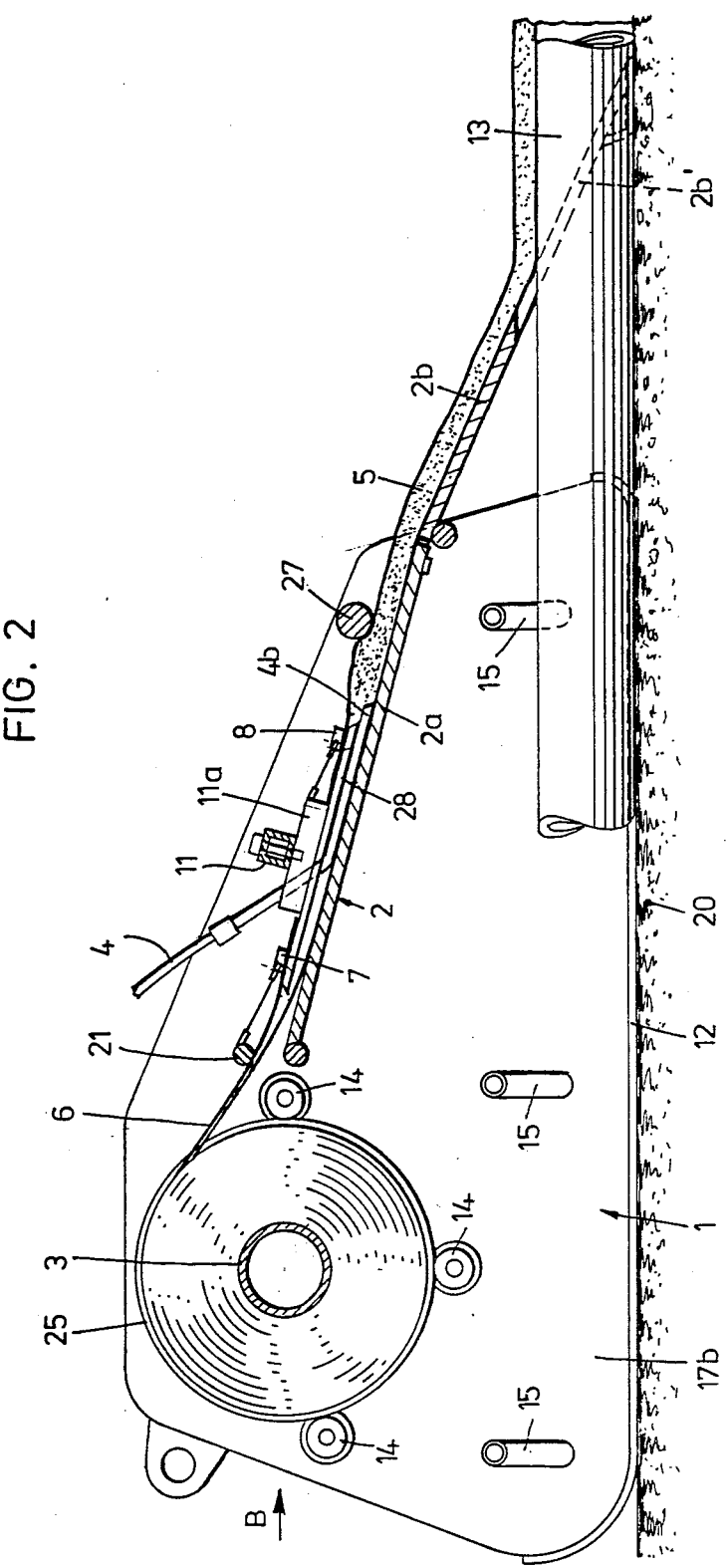
Figure 3:
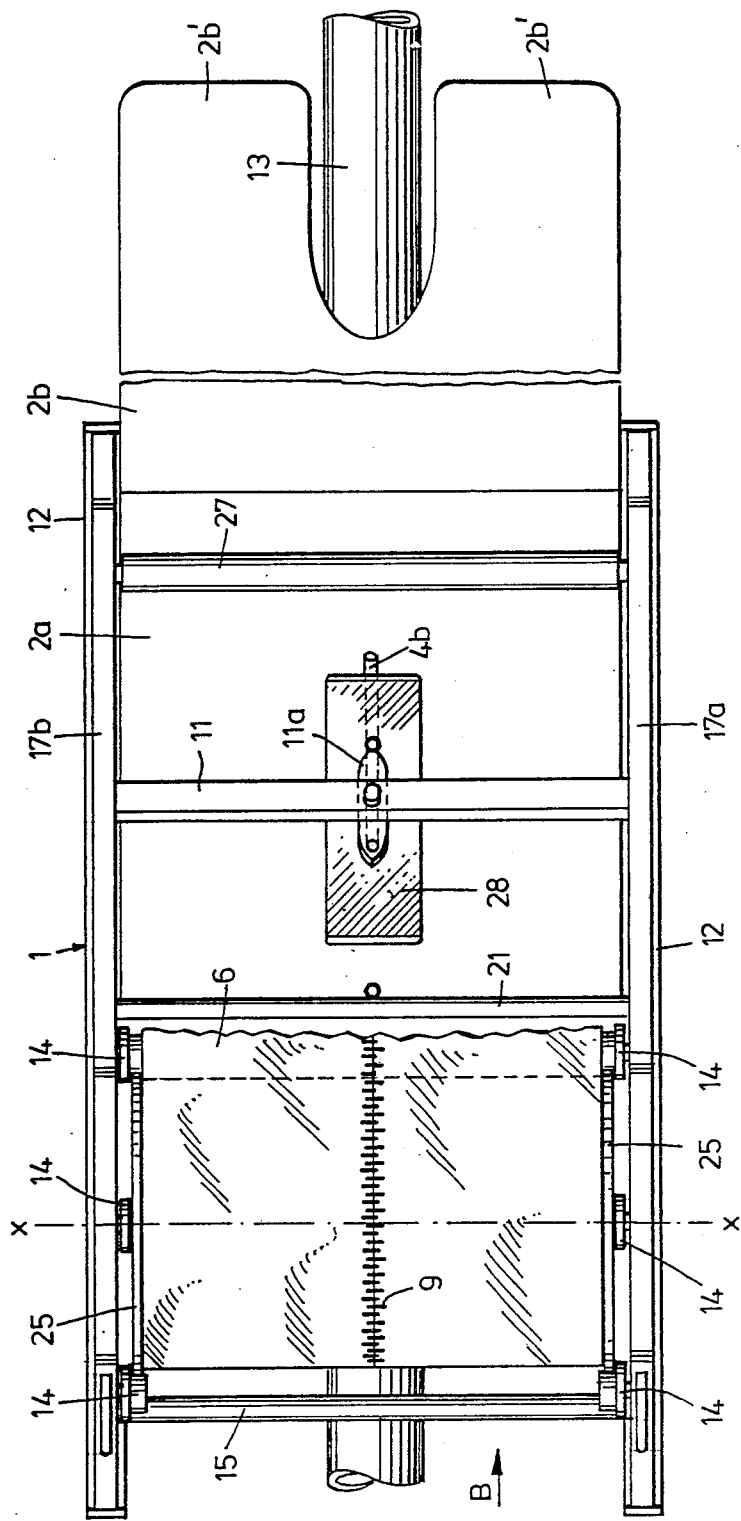
Figure 4:
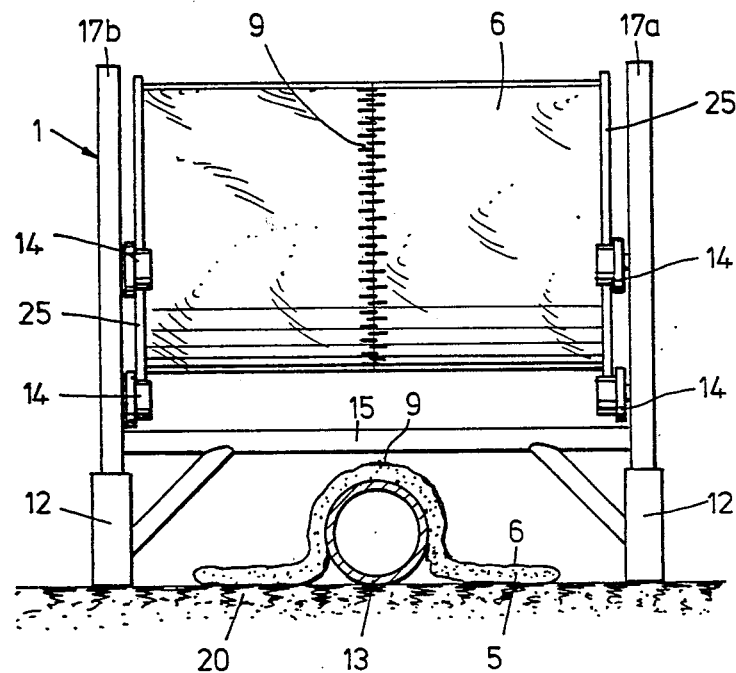
Figure 5:
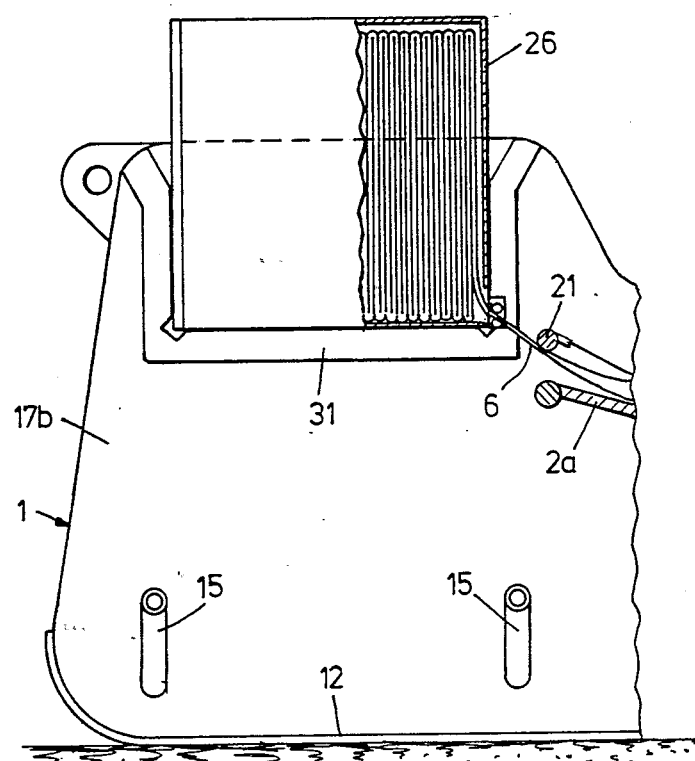
Figure 8:
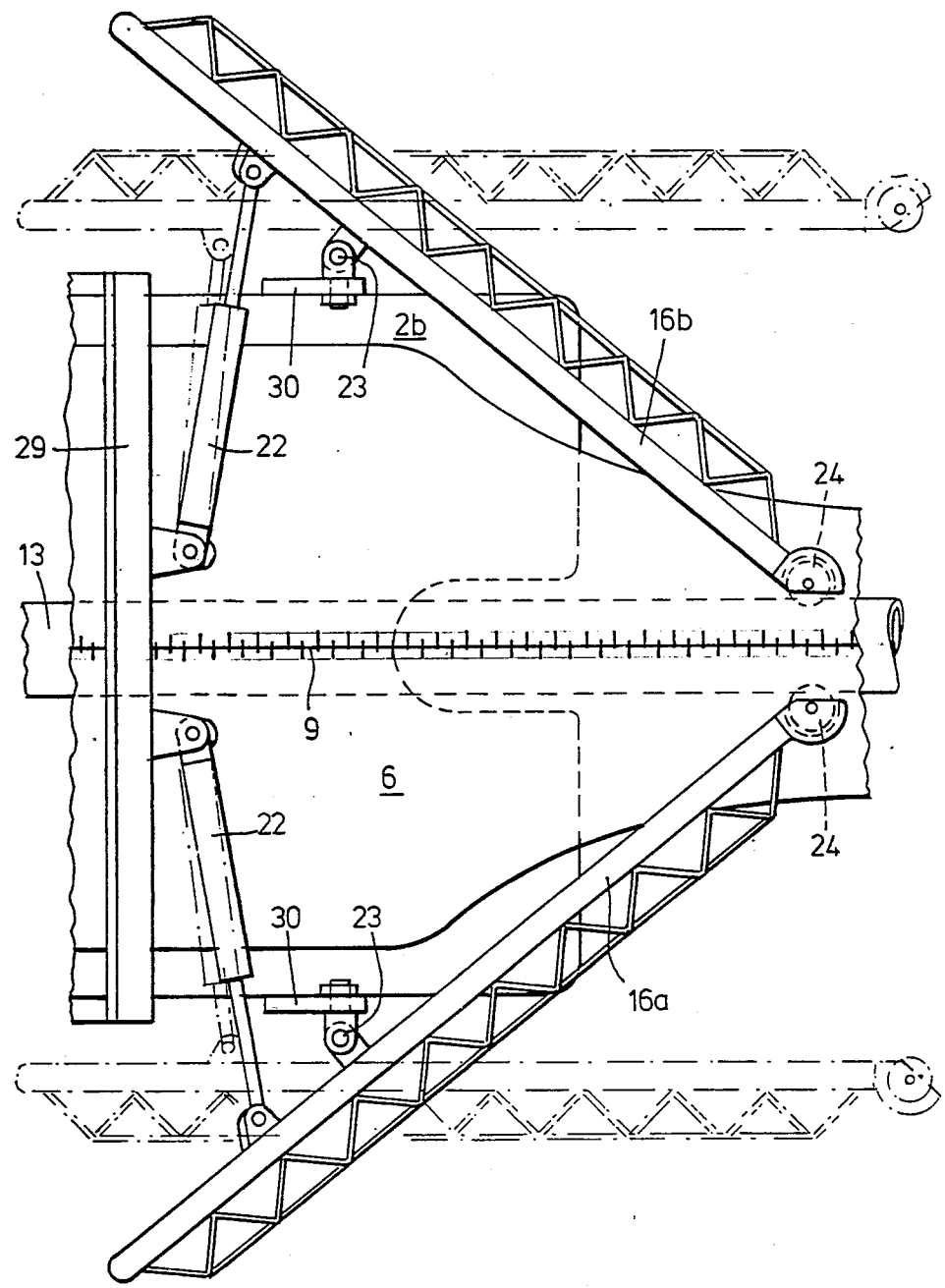
Figure 9:
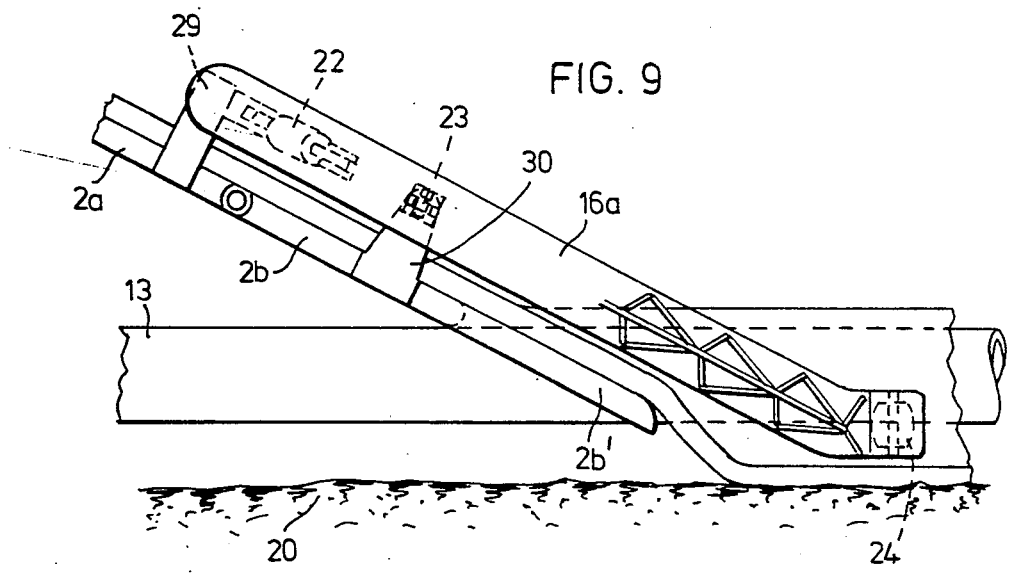
Figure 10:
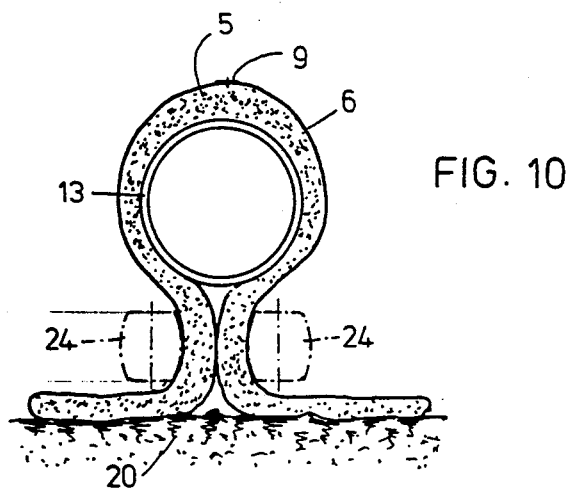
Figure 11:
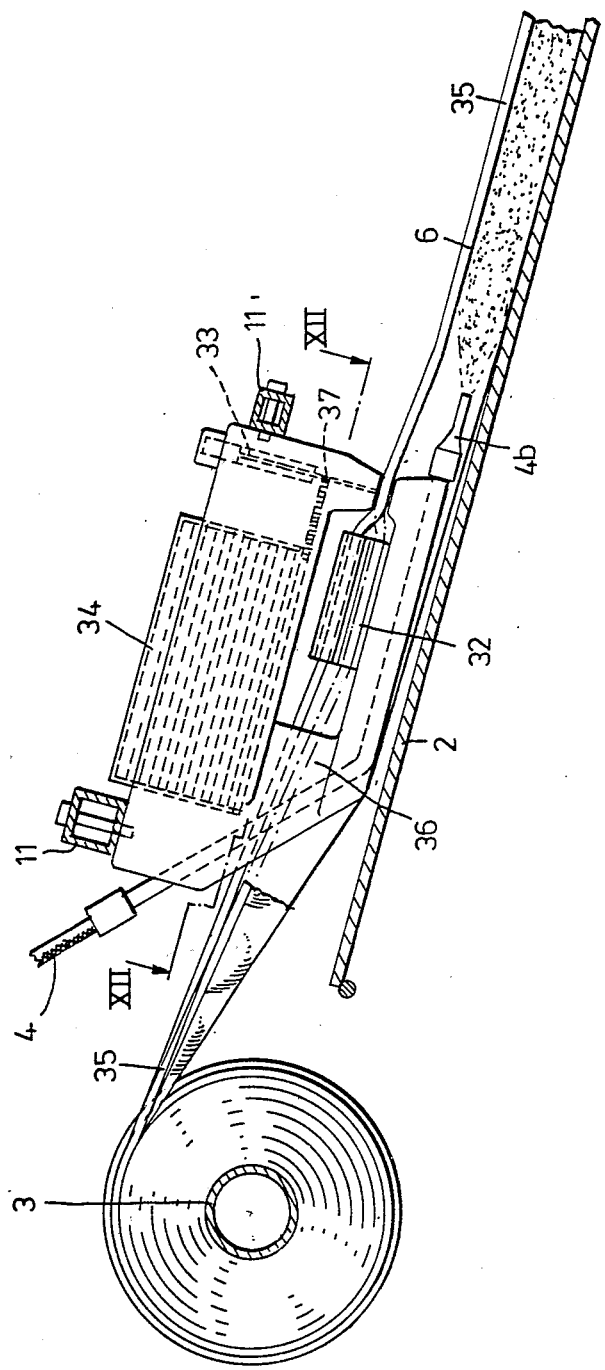
Figure 12:
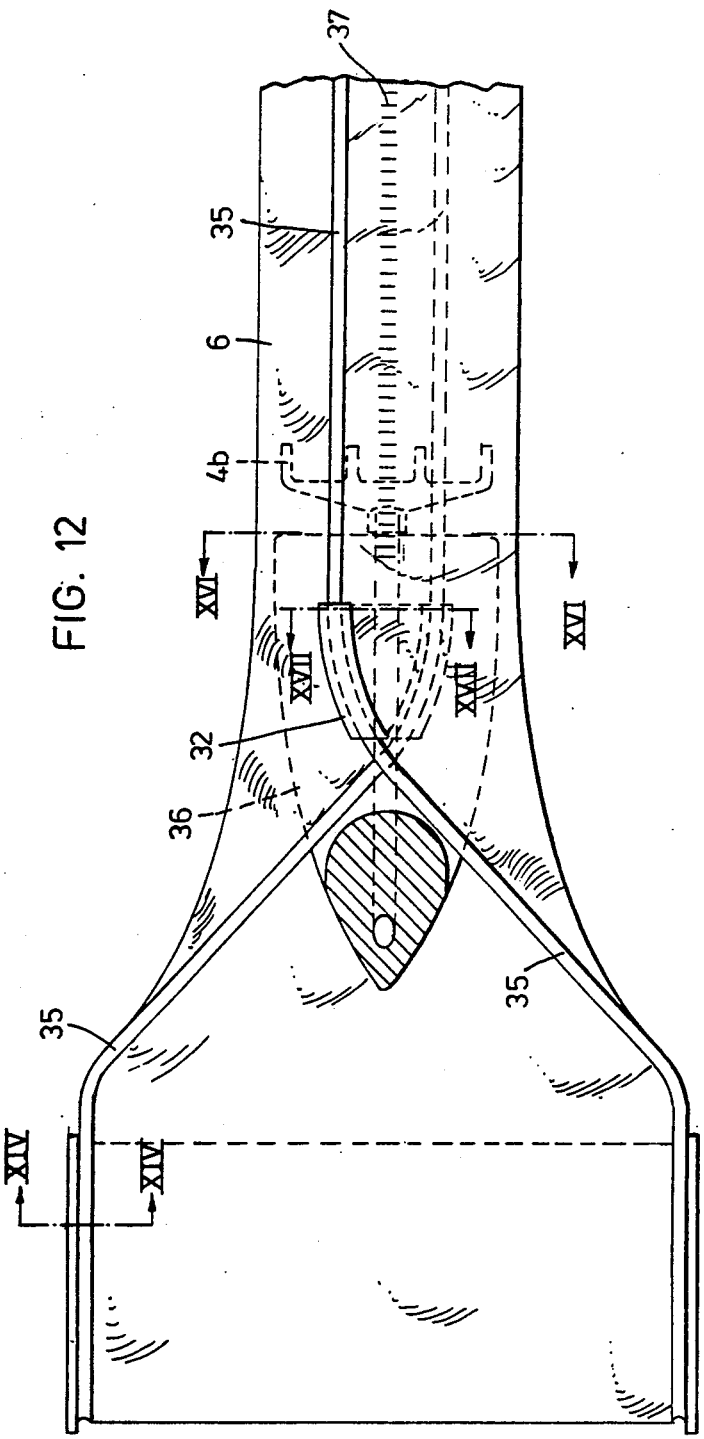
Figure 13:
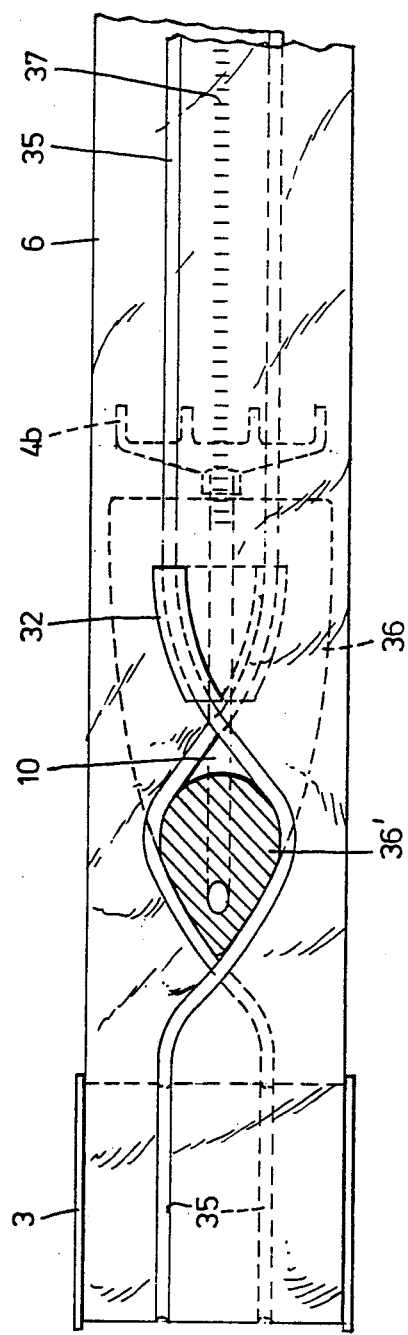
Figure 14:
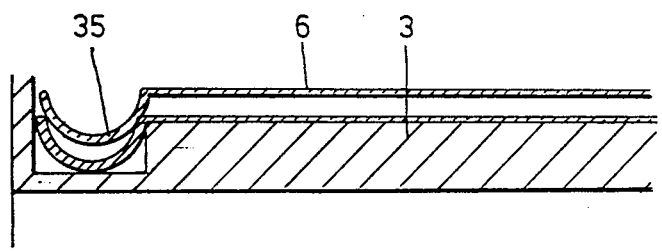
Figure 15:
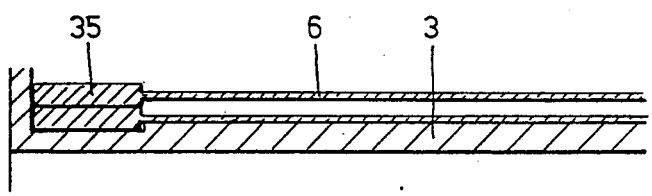
Figure 16:
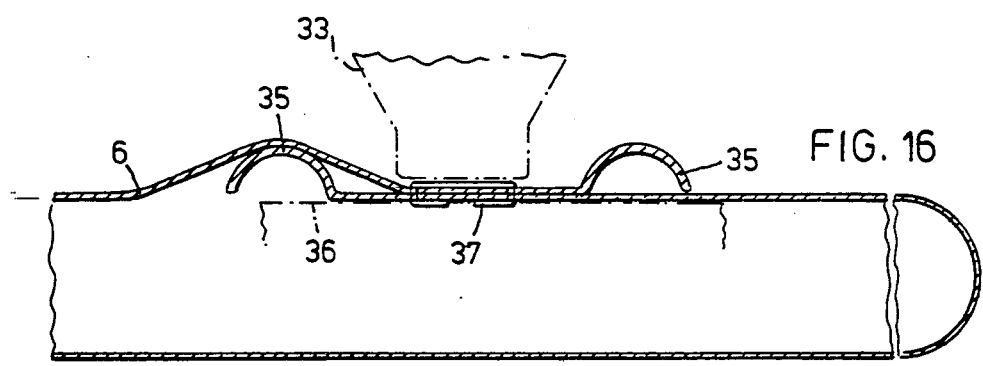
Figure 17:
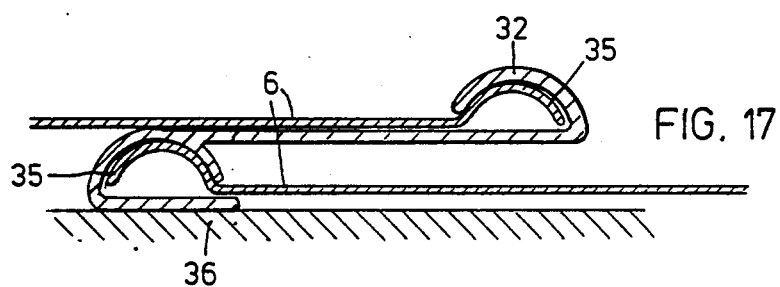

Preferred embodiments of the invention will now be described in detail with reference to the accompanying drawings, in which:

FIG. 1 is a perspective view of the apparatus according to the invention being towed over a structure at the bottom of a body of water by a surface vessel, FIG. 2 is a longitudinal section through the apparatus of FIG. 1, lying over a structure on the bottom, FIG. 3 is a top plan view of the apparatus of FIG. 2 without the two zipper slides, FIG. 4 is an end-on view of the apparatus of FIG. 2, looking in the direction indicated by arrow B, FIG. 5 is a partial elevation of the apparatus having a supply contrivance for the casing in the form of a container which is shown partially in section, FIG. 6 is a partial sectional view of the opening in the casing and of the attachment of the outlet end of the pressure hose, FIG. 7 is a partial top plan view of the casing of FIG. 6, FIG. 8 is a top plan view of the launching portion of the table having swivellable arms disposed thereon, FIG. 9 is an elevation of the launching table-portion of FIG. 8, FIG. 10 is a cross-section through the pipeline with a covering reaching under the structure being laid thereon, FIG. 11 is a partial longitudinal section through apparatus in an embodiment having a guide of S-shaped cross-section for the long edges of a web of material and a stapler for stapling the edges together, FIG. 12 is a top plan view of a section taken on the line XII—XII of FIG. 11, FIG. 13 is a top plan view of a further embodiment in which the edges of the web of material are separated to form an opening, FIG. 14 is a partial section taken on the line XIV—XIV of FIG. 12, in which the long edges of the web are provided with arcuate reinforcement portions, FIG. 15 is a section similar to FIG. 14, in which the long edges of the web are provided with flat reinforcement portions, FIG. 16 is a section taken on the line XVI—XVI of FIG. 12, FIG. 17 is a section taken on the line XVII-—XVII of FIG. 12.

FIG. 18 is a view, partially in elevation and partially in section, of the opening in the casing and the attachment of the outlet end of the pressure hose, and FIG. 19 is a partial top plan view of the casing of FIG. 18.

In order to protect a structure laid on the bed of a sea, lake, river, or canal—such as an oil or gas pipeline or an electric or telephone cable—from scouring by water currents or from damage inflicted by wreckage, anchors, fishing nets, and the like, a covering is laid over the structure.

In the embodiment illustrated in FIGS. 1–7, the apparatus serving this purpose is towed on a towline 19 in the direction indicated by arrow A and controlled by a surface vessel 18. The apparatus comprises a vehicle in the form of a sledge 1 movable immediately over a structure laid under water, in this case, a pipeline 13. Sledge 1 has two sidewalls 17a, 17b connected by cross-struts 15 and provided with runners 12 which slide over the bed 20 of the body of water (FIGS. 2 and 3). Cross-struts 15 are situated above pipeline 13.

By means of the apparatus according to the invention, a piece of ground situated under water, instead of a structure, may likewise be provided with a covering. Furthermore, the sledge 1 or other vehicle might be self-propelled instead of being towed on a towline by a surface vessel.

As may be seen in FIG. 3, a reel 3 is disposed between spaced sidewalls 17a, 17b for rotation about a horizontal axis X. Wound on reel 3 is a casing in the form of long sleeve 6 folded flat. Reel 3 is removably mounted between walls 17a, 17b by means of flanges 25 running on bearings 14.

Accomodated in sledge 1 behind reel 3, relative to the direction of travel of sledge 1, is a table 2 sloping downward from reel 3 to pipeline 13. Table 2 is secured to walls 17a, 17b and is made up of two parts, a laying portion 2a an a launching portion 2b hinged at one end to portion 2a and resting at the other end on pipeline 13 (or on the piece of ground to be covered, as the case may be). Table 2 is inclined at an angle of about 30 degrees to bed 20.

Reel 3 may be replaced by a container 26, insertable in a holder frame 31 and accommodating the flat sleeve 6 folded accordion-wise (see FIG. 5).

Sleeve 6 is provided along its entire length with a zipper 9. A front zipper slide 7, relative to the direction of travel of sledge 1, is attached to a transverse pipe 21 situated ahead of front slide 7, whereas a rear zipper slide 8 is attached to a shuttle 11a, secured to a cross-bar 11 (FIGS. 6 and 7). Transverse pipe 21 and cross-bar 11 are both secured to sidewalls 17a, 17b of sledge 1. A plate 28 is disposed beneath slides 7 and 8.

Passing through cross-bar 11 is a metal nozzle 4b of a flexible pressure hose 4 for conveying concrete 5 of plastic consistency. The intake end 4a of hose 4 communicates with surface vessel 18, on board which is a concrete plant (not shown) supplying concrete in plastic state, under pressure, to hose 4 leading from vessel 18 down through the water to sledge 1.

As sleeve 6 unrolls from reel 3, it is continuously opened and reclosed along its entire length by means of slides 7 and 18. Thus, there is formed in sleeve 6 an opening 10 which is always uniform because the spacing between front slide 7 and rear slide 8 remains constant. Nozzle 4b of hose 4 passes through opening 10 into the interior of sleeve 6. Concrete 5 is controllably injected into sleeve 6 via pressure hose 4 from surface vessel 18.

In the embodiment of the apparatus illustrated in FIGS. 11 and 12, a flat web 6' of casing material is wound on reel 3 instead of sleeve 6. For this purpose, reel 3 must be about twice as wide as in the embodiment of FIGS. 1–7. The long edges of web 6' take the form of either arcuate reinforcement portions 35 (FIG. 14) or flat reinforcement portions 35' (FIG. 15). Other forms of such reinforcement portions, e.g., a V-shape, are also conceivable.

As may be seen from FIG. 12, no opening is formed in the casing in this embodiment. The long edges of web 6' are brought together as it unwinds, by means of a guide member 32 of S-shape cross-section secured to a support 36 which is fixed to sledge 1, in such a way that the long edges overlap, after which they are fastened together. In this embodiment, nozzle 4b of hose 4 does not enter the casing until web 6' has thus been formed into a closed sleeve 6.

In the embodiment of FIG. 13, web 6' is wound on reel 3 in such a way that its long edges partially overlap; they may also be detachably connected. As web 6' unwinds, its long edges are led around an opener portion 36' of support 36, whereby a consistently uniform opening 10 is produced. The long edges of web 6' are then brought together again by means of guide member 32 so that they overlap and can be fastened together to form a casing of closed cross-section. Pressure hose 4 for conveying concrete 5 of plastic consistency passes through opener portion 36' of support 36 and through opening 10 so that nozzle 4b ends within sleeve 6 thus formed.

In order to fasten the long edges of web 6' firmly together, a stapler 33 having a staple magazine 34 is provided on support 36 (FIG. 11). By hydraulic or pneumatic operation of stapler 33, the overlapping long edges of web 6' are stapled together to form a sleeve 6. The manner in which this is achieved by means of staples 37 may be seen in FIG. 16. FIG. 17 shows guide member 32 of S-shaped cross-section, intended for use in the embodiments of both FIG. 12 and FIG. 13.

The embodiment of the apparatus illustrated in FIGS. 18 and 19 is fundamentally the same as that of FIGS. 6 and 7 except that front slide 7 of zipper 9 has been omitted. The long edges of a web of material wound on a reel are provided with unjoined rows of zipper teeth 9a. As the web of material unwinds, its long edges are guided around shuttle 11a of cross-bar 11 and thus parted. Behind shuttle 9a, the two rows of teeth 9a of zipper 9 are joined by means of slide 8 to form a sleeve 6 of closed cross-section. Here the end of nozzle 4b of hose 4 is situated behind slide 8, relative to the direction of travel of sledge 1, within sleeve 6.

Reverting to FIGS. 1 and 2, it will be seen that owing to the movement of sledge 1 in the direction of travel indicated by arrow A, and owing to the weight of sleeve 6 filled with concrete 5, sleeve 6 slides over parts 2a, 2b of table 2, whereupon the concrete, being of plastic consistency, spreads out evenly within sleeve 6 on laying portion 2a and thus ensures that sleeve 6 is of uniform thickness.

The quantity of concrete 5 introduced into sleeve 6 is monitored by means of a rubber roller 27, shown only schematically in FIGS. 2 and 3, having a device for signalling the thickness of sleeve 6. The concrete-filled sleeve 6 then continues to slide over launching portion 2b of table 2 toward pipeline 13 (or toward the piece of ground to be covered, as the case may be) and is continuously laid upon it. Because launching portion 2b of table 2 having extensions 2b' which slide over bed 20, is hinged to laying portion 2a, portion 2b is able to adapt to irregularities of bed 20. Moreover, launching portion 2b ensures that concrete-filled sleeve 6 is uniformly laid over pipeline 13 even when sledge 1 is not properly centered.

If there is free space between pipeline 13 and bed 20 of the body of water, and if it is therefore intended to lay sleeve 6 containing concrete 5 at least partially beneath pipeline 13, concrete-filled sleeve 6 is shaped at the end of table portion 2b nearest pipeline 13. For this purpose, two arms 16a, 16b, which can be universally swivelled by means of hydraulic or pneumatic cylinders 22, are provided at the sides of launching portion 2b ( FIGS. 8 and 9). Arms 16a and 16b are mounted in bearings 23 secured to supports 30, are structurally reinforced, and are provided at their operative ends with rubber-covered rollers 24 which press against concrete-filled sleeve 6 to give it the shape shown in FIG. 10. Cylinders 22 are swivel-mounted on a beam 29 which is secured to the outside edges of table portion 2b and is spaced therefrom in the manner of a bridge, running at right angles to the longitudinal axis thereof.

Flat-folded web 6' or sleeve 6 has an average length of 500 m and a width of up to 10 m. When filled with plastic concrete 5, sleeve 6 is about 10 cm thick. When the supply of flattened sleeve 6 or web 6' runs out, reel 3 or container 26 is removed from sledge 1 by means of a crane (not shown), and a fresh reel or container of casing material is inserted in sledge 1. A length of this material is then unwound or withdrawn so that either zipper 9 can be threaded into slides 7 and 8 or the long edges of the material can be inserted into guide member 32. This work must naturally be carried out by divers. In order that the accurate laying of the covering may be checked from surface vessel 18, the apparatus can be monitored by means of a television camera.

By means of the apparatus described above, a covering can be laid accurately and expeditiously on a pipeline at the bottom of a body of water or on a piece of ground situated under water. The cost of operating such apparatus is substantially less than for any prior art apparatus of this type. The 500-meter-long casing can be laid as a covering in 24 hours. In place of a zipper with two slides, a separating and welding device may be used.

What is claimed is:

1. A method of laying a covering over a submerged structure or on a subaqueous piece of ground on the bed of a body of water, of the type wherein the covering is formed by controllably filling a flexible casing lying directly over the structure or piece of ground with a substance under pressure from a vessel on the surface of the body of water, wherein the improvement comprises the steps of:
    disposing a web of casing material in or on a supply contrivance associated with a support secured to a vehicle movable over said structure or piece of ground along the bed of the body of water by the surface vessel,
    causing the web to be continuously withdrawn from the supply contrivance onto the support,
    continuously joining the long edges of the web to form a said casing having a closed cross-section,
    filling the casing with said substance, and
    causing the filled casing acted upon by the force of gravity and the movement of the support along the bed of the body of water by the surface vessel to slide toward the structure or piece of ground and to be laid continuously thereon as a said covering.

2. The method of claim 1 wherein the long edges of the web are initially joined, comprising the further step of continuously separating the long edges of the web after the step of withdrawal from the supply contrivance and prior to the step of continuously joining the edges to form the casing, thus creating a consistently uniform opening through which the casing is filled with said substance.

3. The method of claim 1 or claim 2, comprising the further step of causing two lateral, universally swivellable arms to press upon the filled casing for the purpose of shaping the covering during laying thereof.

4. The method of claim 1 or claim 2, wherein the long edges of the web of material are joined by causing them to overlap and fastening them together.

5. The method of claim 1 or claim 2, wherein the long edges of the web of material are joined by means of a zipper.

6. Apparatus for laying a covering over a submerged structure or on subaqueous piece of ground located on the bed of a body of water, of the type having a vehicle movable along the bed of the body of water over the structure or the piece of ground by, and controllable by, a surface vessel located on top of the body of water, and means for controllably filling a casing with a substance under pressure to form said covering, wherein the improvement comprises:
    a supply contrivance detachably secured to said vehicle for holding a web of casing material, said vehicle being supported by a subaqueous piece of ground on the bed of the body of water;
    a pressure hose secured at the outlet end thereof to said vehicle for conveying said substance and intended to communicate at the intake end thereof with said surface vessel,
    a nozzle secured to said outlet end of said pressure hose and arranged to open out into the interior of said casing, and a table secured to said vehicle adjacent to said supply contrivance to support said web as it is being filled with said substance and to release said web for covering action when filled.

7. The apparatus of claim 6, wherein said supply contrivance is a reel rotatable about a horizontal axis, said substance being concrete.

8. The apparatus of claim 6 for use with a said casing having a zipper disposed along the entire length thereof, said apparatus further comprising a first zipper slide for opening said zipper and a second zipper slide for reclosing said zipper, said first zipper slide being disposed between said supply contrivance and said second zipper slide, and the spacing between said first and second zipper slides being equal to the desired length of the opening to be created in said zipper.

9. The apparatus of claim 6, further comprising a guide member of S-shaped cross-section for joining the long edges of said web of casing material and a stapling device situated adjacent to said guide member on the side thereof remote from said supply contrivance, said guide member and said stapling device both being secured to said vehicle.

10. The apparatus of claim 6, further comprising two universally swivellable arms mounted one on each side of said second table portion for shaping said casing after filling thereof.

11. The method of laying a covering over a submerged structure or on a subaqueous piece of ground as in claim 1, including joining the long edges of the web together under water, and causing the filled casing to slide off the support by inclining said support downwardly and by pulling said support along the submerged structure or subaqueous piece of ground.

12. A method of laying a covering over a submerged structure or on a subaqueous piece of ground on the bed of a body of water, of the type wherein the covering is formed by controllably filling a flexible casing lying directly over the structure or piece of ground with a substance under pressure, wherein the improvement comprises the steps of:

disposing a web of casing material in or on a supply contrivance associated with a submerged support secured to a vehicle movable along the bed of the body of water over said structure or piece of ground by a vessel on the surface of the body of water, causing the web to be continuously withdrawn from the supply contrivance onto the support, continuously joining the long edges of the web when submerged to form a said casing having a closed cross-section, filling the closed cross-section casing with said substance, and thereafter causing the filled casing to be laid on the structure or piece of ground by the movement of the support by the surface vessel.

* * * * *